Aug. 14, 1956  R. A. FRYKLUND  2,759,168
ECHO DEPTH SOUNDER ALARMS

Filed March 24, 1954  2 Sheets-Sheet 1

INVENTOR
ROBERT A. FRYKLUND
BY Elmer J. Gorn
ATTORNEY

Aug. 14, 1956  R. A. FRYKLUND  2,759,168
ECHO DEPTH SOUNDER ALARMS
Filed March 24, 1954  2 Sheets-Sheet 2

INVENTOR
ROBERT A. FRYKLUND
BY
ATTORNEY

United States Patent Office 2,759,168
Patented Aug. 14, 1956

2,759,168

ECHO DEPTH SOUNDER ALARMS

Robert A. Fryklund, Dedham, Mass., assignor to Raytheon Manufacturing Company, Waltham, Mass., a corporation of Delaware Application March 24, 1954, Serial No. 418,395

1 Claim. (Cl. 340—29)

This invention relates to echo ranging apparatus and more particularly to sonic echo depth sounders.

Sonic pulse echo depth sounders usually have indicators on which the ranges or depths of water may be displayed. A common type of indicator is the recording indicator wherein a stylus is drawn across an electrically sensitized paper such that, if echo signals are applied to the stylus, they will produce a mark on the paper. Another type of indicator utilizes a neon lamp rotating on an arm with the echo signals applied to the light such that the range or depth is indicated by the rotational position at which the neon lamp lights.

This invention discloses a particular audible type of depth indicator for use in conjunction with any of the conventional indicators, said audible indicator comprising a bell energized by echo signals.

In addition, this invention discloses a signal range gating system whereby the bell will be actuated only by signals corresponding to a predetermined range of depth. Briefly, this range gate comprises an electrically conductive track adapted to be contacted by an electrically conductive contactor electrically connected to the indicating element, such as the stylus or neon lamp of the conventional indicator. The length of the track contacted by the electrical contactor, as it moves along the track, is made adjustable whereby the echo ranges at which signals will pass from the contactor through the track to ring the bell may be set at will.

Other and further objects and advantages of this invention will be apparent as the description thereof progresses, reference being had to the accompanying drawings, wherein.

Figure 1:
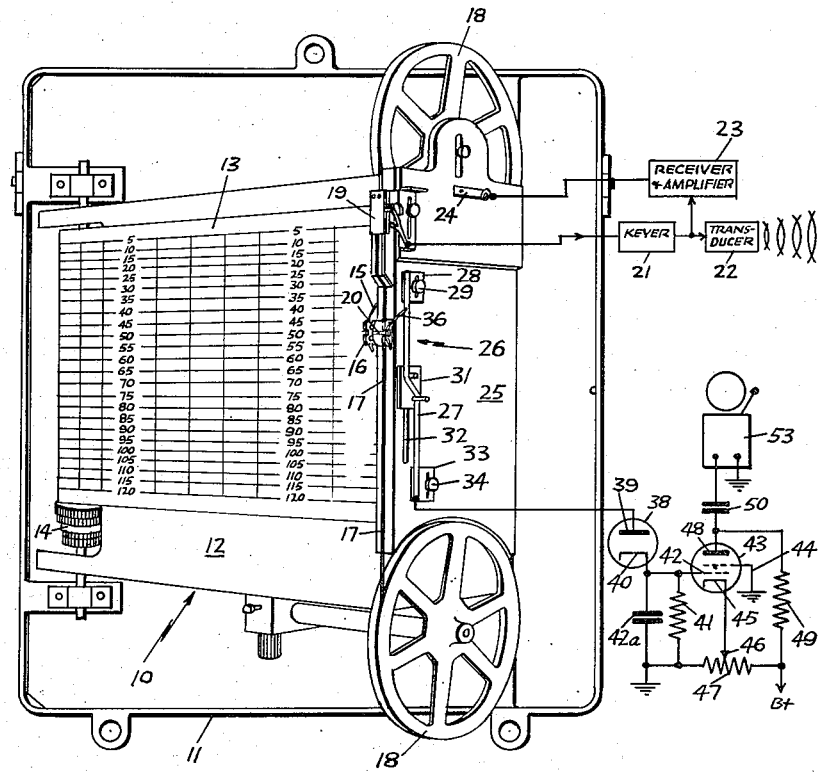
Fig. 1 illustrates a front plan view of a recording indicator with a bell alarm indicator attachment embodying the invention and a block diagram of an echo depth sounding system in which the indicator embodying the invention can be used.
Figure 2:
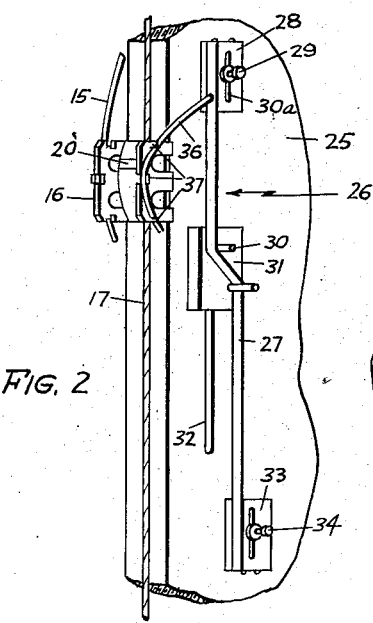
Fig. 2 is an enlarged view of the conductive track and contactor assembly illustrated in Fig. 1 and used as the adjustable range gate.
Figure 3:
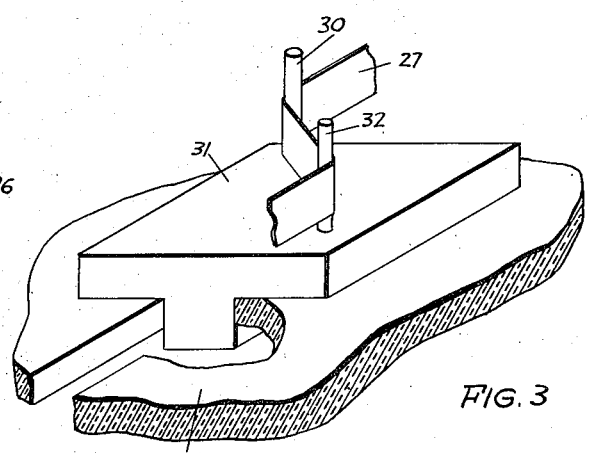
Fig. 3 is a further enlarged view of the adjustable track support used for adjusting the position and extent of the range gate.

Referring now to Figs. 1 through 3, there is shown a recording indicator 10 mounted in a cabinet 11 and comprising a metal platen 12 across which a sensitized paper 13 is horizontally drawn by means of a paper drive roller 14. A flexible metal stylus 15 is drawn vertically downward along the edge of platen 12 away from which the paper 13 moves. Stylus 15 is attached to holder 16 mounted on a flexible wire 17, which is supported at points above and below the paper 13 by pulleys 18, which, in turn, are supported on spindles mounted on the frame of the recorder. A pair of keying contacts 19 is mounted on the recorder frame and is periodically contacted by a metal bar 20 set in a plastic block attached to the stylus holder 16 such that the contact of the elements 19 by the bar 20 pulses a keyer 21, sending a pulse of sonic energy through a transducer 22 downward into the water body whose depth is to be measured. Returning echoes are picked up by transducer 22 and fed through a receiver amplifier 23 to a brush 24 mounted on the support of the upper wheel 18 and contacting the hub of the upper wheel 18 through a hole in said support, said hub being metal whereby said signals are fed through wheel 18 and belt 17 to stylus holder 16 and hence to stylus 15. The details of the structure described so far are identical with, and are more completely set forth in, the disclosure of my copending application, Serial Number 119,905, filed October 6, 1949, now patent No. 2,715,055 dated August 9, 1955.

Stylus holder 16 is guided by the edge of a nonconductive support member 25 positioned between upper and lower pulleys 18 as stylus 15 is drawn across paper 13. Member 25 is also shown herein as supporting the variable length conductive track assembly 26 used as the variable range gate whose output is used to actuate the audible alarm. As shown herein, assembly 26 consists of a flexible metallic strip 27 whose upper end is rigidly attached, as by soldering, to an upper support block 28 attached to member 25 by thumbscrew 29 which passes through a slotted hole in block 28 and threadedly engages support member 25. Metal strip 27 extends downwardly from block 28 parallel to the edge of support member 25 closely adjacent thereto and passes over a pin 30 mounted on a block 31 movable vertical in a slot in support member 25. After passing over pin 30, conductor 27 extends away from the edge of support member 25 on which the stylus holder 16 is guided and after passing around a second pin 32, mounted on block 31, extends downwardly again and is attached to a lower support block 33 as, for example, by soldering. Lower support block 33 is attached to support member 25 by means of a thumbscrew 34 extending through a vertically slotted hole in block 33 and threadedly engaging support member 25.

A second flexible contact member 36, similar to stylus 15, is mounted on the opposite side of stylus holder 16 from stylus 15 by means of three studs 37 in a manner similar to stylus 15. Contactor 36 is shaped to contact the portion of conductor 27 between upper block 28 and pin 30, but does not contact conductor 27 below pin 30. The support system for the keying contacts 19 is spaced sufficiently from the edge of support member 25 to allow the stylus 36 to pass the keying contacts 19 and their support assembly. The contactor 36 is somewhat shorter than the stylus 15, and hence contacts the flexible conductor 27 at a point somewhat below the point where the stylus 15 contacts the paper. Hence, the upper support block 28 is positioned somewhat below the upper edge of the paper 13. In addition, it is positioned sufficiently far below the upper edge 13 that contactor 36 will not have contacted upper block 28 when the outgoing pulse is picked up by the receiver 23 to produce the zero mark on the paper, hence preventing ringing of the bell or audible alarm by the outgoing signal.

The audible alarm system, as shown by way of example, comprises a diode 38 whose anode 39 is fed echo signals from the flexible conductor 27 in the form of positive pulses. The cathode 40 of diode 38 is connected to ground through a load resistor 41 bypassed by an R. F. bypass condenser 42a whereby signals picked up by flexible conductor 27 will be detected by diode 38 and will appear as D. C. pulses at the cathode 40. Cathode 40 is connected to the control grid 42a of a thyratron 43 whose screen grid 44 is grounded and whose cathode 45 is connected to the movable tap 46 of a potentiometer 47, one side of which is connected to ground and the other side of which is connected to B+ whereby adjustment of the position of tap 46 adjusts the fixed bias on the thyratron 43, and hence adjusts the threshold level of signals which will fire thyratron 43. The anode 48 of thyratron 43 is connected to B+ through a charging resistor 49 and through a charged storage condenser 50 and the actuating winding of a solenoid-operated bell 53, the other end of said winding being connected to ground whereby bell 53 rings every time thyratron 43 is fired. The value of resistor 49 is made sufficiently high so that the thyratron discharge will not be self-sustaining by reason of the current drain through resistor 49. Rather the thyratron 43, together with condenser 50 and resistor 49, will behave as a self-quenching pulse generator wherein firing of the thyratron causes the condenser 50 to discharge through the winding 51 until the anode voltage becomes sufficiently low to extinguish the thyratron. The condenser 50 then recharges slowly through the resistor 49. The time of travel of the stylus 15 across the paper 13 is several times longer than the time constant of the condenser 50 and resistor 49 whereby the bell 53 may be rung several times as the stylus moves across the paper.

In operation, the slidable block 31 is set to correspond to the maximum depth above which it is desired that echo signals, corresponding, for example, to fish, will actuate the bell. Usually when searching for fish, this setting will be somewhat above the bottom of the water body. Under these conditions, the operator need not pay constant attention to the depth sounder in order to locate fish, since the presence of fish within the desired range will actuate the bell whereupon the operator, by inspection of the recording indicator, may determine the depth and number of the fish. The device may also be used as a shoal warning system whereupon the block 31 is set to the depth greater than that at which navigation is considered safe and less than that at which navigation becomes hazardous. If the ship then moves into water of a depth less than that corresponding to the setting of block 31, the bell will ring, thereby notifying the operator of approaching shallow water, the bottom contour and rate of shoaling being then determined by the operator by visual inspection of the recording indicator.

Figure 5:
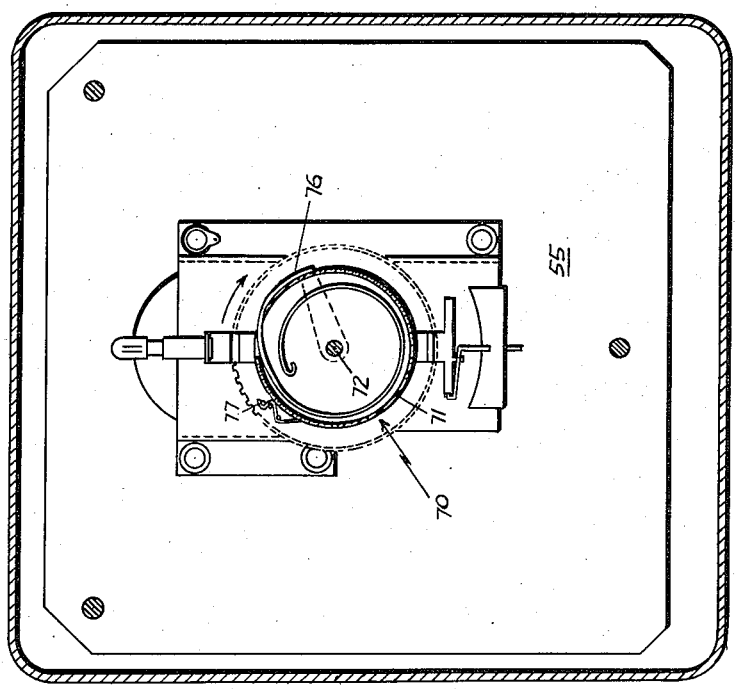
Fig. 5 is a longitudinal cross-sectional view of the device shown in Fig. 4 taken along line 5—5 of Fig. 4 and showing details of the extensible track.
Figure 4:
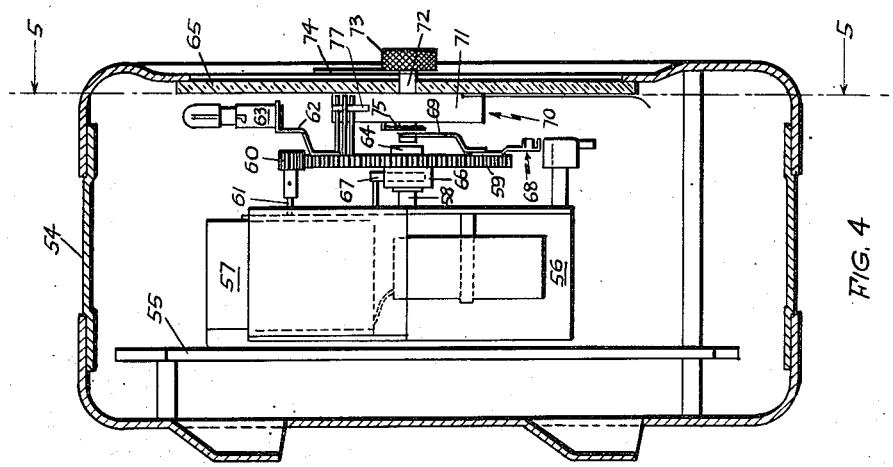
Fig. 4 illustrates a transverse cross-sectional view of a neon lamp indicator having an extensible range gate track attachment for use with this invention.

Referring now to Figs. 4 and 5, there is shown a modification of the invention illustrated in Figs. 1 through 3 for use with a rotating arm or red light indicator. The red light indicator illustrated in Figs. 4 and 5 is essentially similar to that disclosed in my copending application, Serial Number 220,684, filed April 12, 1951, differing therefrom essentially in that, in the device illustrated herein, the carrier for the rotating red light is a fiber gear driven by a pinion gear attached to the motor shaft, whereas, in the device disclosed in said copending application, the red light carrier is connected directly to the motor shaft. For a more complete description of the operational details of the red light indicator, reference may be had to said copending application.

Briefly, the device illustrated in Figs. 4 and 5 comprises a case member 54 in which is mounted a support plate 55 to which is attached a U-shaped channel support 56 carrying motor 57 and a shaft 58 carrying fiber gear 59 driven by pinion 60 attached to the shaft 61 of motor 57. Attached to gear 59, on the opposite side thereof from the support bracket 56 and motor 57, is an arm 62 on which is mounted a lamp socket 63 carrying a neon lamp 64 visible through a glass front panel 65 in case 54 during the entire rotation of gear 59. Mounting bracket 62 is connected to one of the terminals of socket 63. The other terminal of socket 63 is connected by an electrical conductor to a slip-ring 66 mounted on gear 59, and hence by means of a brush 67 contacting ring 66 to the output of the receiver amplifier of the indicator. A keying switch contact assembly 68 is mounted on the opposite side of gear 59 from support 62, contact member 68 being connected to support 62 and through a brush contact 69 to the stationary metal shaft 58 supporting gear 59.

Mounted on the inside of face 65 is a flexible conductor assembly 70 comprising a cylindrical case of insulating material 71 somewhat smaller in diameter than gear 59 positioned coaxially therewith and attached to glass face 65 by any desired means, bolts or glue. A shaft 72 extends through the face 65 coaxial with container 71 and has attached to the outer end thereof a knob 73 having a pointer 74. The inner end of shaft 72 has a conductive arm 75 connected thereto which extends radially to a point just beyond the edge of container 71 and is attached to the end of a flexible conductor 76 which extends along the outside of container 71 in the direction opposite to the direction of rotation of gear 59 until it reaches the top of container 71 through which it passes with the remainder of conductor 76 being coiled up inside container 71 as shown. Thus rotation of knob 72 causes a greater or less amount of the flexible conductor 76 to be exposed around the outside of container 71, the amount being indicated by the position of pointer 74.

A brush assembly 77 is mounted on the gear 59 and is adapted to contact the exposed portion of conductor 76. Brush assembly 77 is connected to the ungrounded signal lead feeding socket 63 from the echo detector such that signals appearing at socket 63 are also fed to conductor 76 during that portion of the cycle that brush 77 makes contact with conductor 76. An output lead 78 is connected to shaft 72 which is conductive, and hence through arm 75 to conductor 76, said output lead being, in turn, connected to an audible alarm circuit, such as the bell actuating circuit illustrated in Fig. 1. The zero position of the flexible conductor 76 may be oriented by rotation of the container 71 to change the position of the hole through which conductor 76 passes. Preferably, this hole is somewhat to the right of contact assembly 76 when the red light is uppermost corresponding to zero position.

This completes the particular description of the species of the invention illustrated herein. However, many modifications thereof will be apparent to persons skilled in the art without departing from the spirit and scope of this invention. For example, other types of indicators could be used in place of the red light indicator and recording indicator illustrated herein with the audible alarm, and the variable range gate and other types of audible alarms, such as buzzers, could be used in place of the bell-type audible alarm illustrated herein, and, indeed, other types of warning alarms, such as a vessel alarm, could be used. Accordingly, it is desired this invention be not limited to the particular species thereof disclosed herein except as defined by the appended claim.

What is claimed is:

An echo ranging system comprising a source of echo ranging informational signals, a recording indicator fed by signals from said source, said indicator comprising a stylus and means for drawing said stylus along a predetermined path across a record medium, an electrically conductive element electrically connected to said stylus and movable therewith, and a flexible electrically conductive member positioned in contact with said conductive element during movement of said stylus over a portion of said path, the length of said portion being adjustable, said stylus and said electrically conductive element energized directly by the same source of echo ranging informational signals.

References Cited in the file of this patent

UNITED STATES PATENTS

| | | |
|---|---|---|
| 1,516,094 | Hackman | Nov. 18, 1924 |
| 2,437,416 | Bludworth | Mar. 9, 1948 |
| 2,557,197 | Nelson | June 19, 1951 |
| 2,597,199 | Stamper, et al. | May 20, 1952 |
| 2,610,244 | Wolf | Sept. 9, 1952 |